United States Patent [19]

Selsing

[11] 4,228,318

[45] Oct. 14, 1980

[54] METHOD AND MEANS FOR DISSIPATING HEAT IN A HIGH VOLTAGE TERMINATION

[75] Inventor: Jorgen Selsing, Omaha, Nebr.

[73] Assignee: G & W Electric Specialty Company, Blue Island, Ill.

[21] Appl. No.: 869,670

[22] Filed: Jan. 16, 1978

[51] Int. Cl.² ............................................. H02G 15/02
[52] U.S. Cl. ..................... 174/73 R; 174/19; 174/143
[58] Field of Search ............ 174/73 R, 73 SC, 15 BH, 174/16 BH, 19, 143; 361/386

[56] References Cited

U.S. PATENT DOCUMENTS

| | | | |
|---|---|---|---|
| 1,511,935 | 10/1924 | Bayles et al. | 174/143 |
| 1,563,946 | 12/1925 | Atkinson | 174/73 R |
| 1,702,413 | 2/1929 | Pfiffner | 174/143 |
| 1,868,962 | 7/1932 | Atkinson | 174/73 R |
| 1,965,540 | 7/1934 | Atkinson | 174/19 |
| 2,068,624 | 1/1937 | Atkinson | 174/73 R |
| 2,071,102 | 2/1937 | Atkinson et al. | 174/73 R |
| 2,276,923 | 3/1942 | Burr | 174/143 |
| 2,650,334 | 8/1953 | Skeats | 174/143 |
| 2,651,670 | 9/1953 | Bosworth | 174/73 R |
| 2,794,063 | 5/1957 | Nicholas | 174/143 |
| 3,005,868 | 10/1961 | Linderholm | 174/73 R |
| 3,197,551 | 7/1965 | Linderholm | 174/73 R |
| 3,479,443 | 11/1969 | Mashikian et al. | 174/73 R |
| 3,522,364 | 7/1970 | Kagaya | 174/73 R |
| 3,538,241 | 11/1970 | Rein | 174/143 |
| 3,588,319 | 6/1971 | Isogai et al. | 174/143 |
| 3,659,033 | 4/1972 | Grimmer | 174/15 BH |
| 3,673,305 | 6/1972 | Mashikian et al. | 174/12 BH |
| 3,692,928 | 9/1972 | Friedrich | 174/143 |
| 3,716,652 | 2/1973 | Lusk et al. | 174/15 R |
| 3,758,699 | 9/1973 | Lusk et al. | 174/19 |
| 3,793,475 | 2/1974 | Yonkers | 174/73 R |
| 3,796,821 | 3/1974 | Lusk | 174/73 R |
| 3,845,235 | 10/1974 | Bahder et al. | 174/73 R |

FOREIGN PATENT DOCUMENTS 656127  1/1963  Canada ................................. 174/73 R

*Primary Examiner*—Elliot A. Goldberg
*Assistant Examiner*—E. Frederick Borchelt
*Attorney, Agent, or Firm*—Fitch, Even & Tobin

[57] ABSTRACT

A method and means are disclosed for dissipating heat in a high voltage cable termination which includes a plurality of axially stacked annular capacitor elements disposed coaxially over the prepared end of a high voltage cable and disposed within an annular insulator so that a temperature gradient normally exists radially across the capacitor elements. A thermally and electrically conductive annular disc is interposed between each adjacent pair of stacked capacitors for dissipating heat from the area inwardly of the capacitors to the area outwardly thereof. The conductive discs enable a significantly greater increase in terminator ampacity, and may be employed in both AC and DC high voltage systems.

13 Claims, 5 Drawing Figures

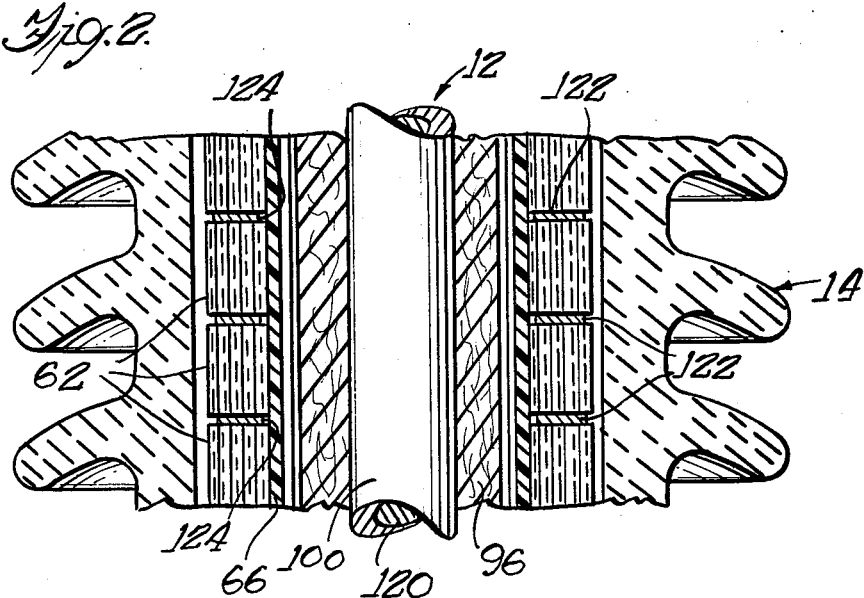
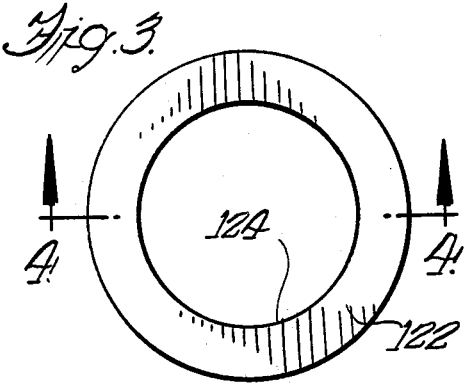
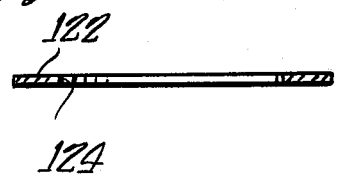
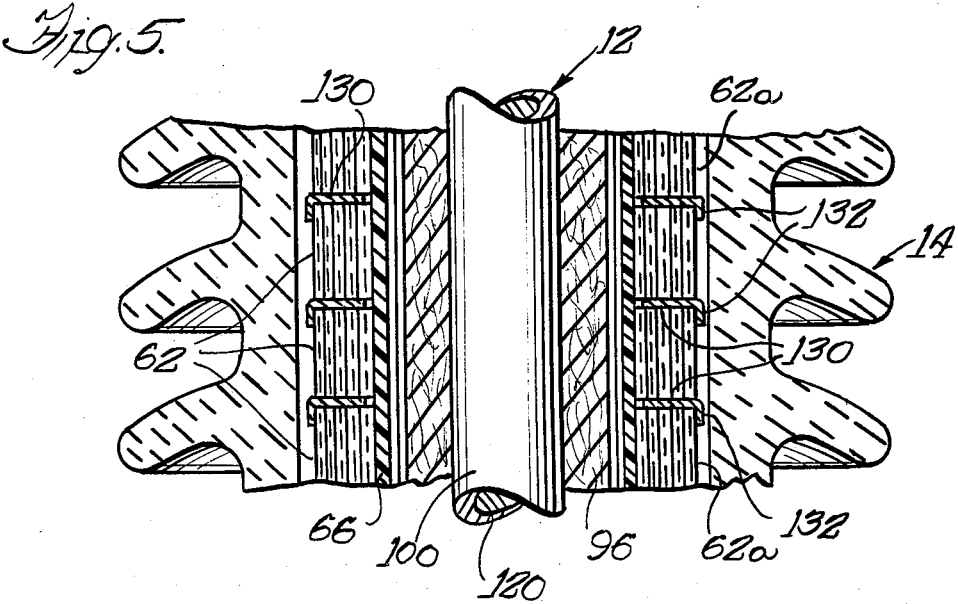

METHOD AND MEANS FOR DISSIPATING HEAT IN A HIGH VOLTAGE TERMINATION

The present invention relates generally to high voltage terminations, and more particularly to a method and means for dissipating heat in a high voltage cable termination having a plurality of stacked capacitors disposed coaxially over the prepared end of a high voltage cable and within an annular insulator. In accordance with the invention, thermally and electrically conductive discs are interposed between the stacked capacitors to provide improved heat transfer from radially inwardly of the capacitors to the area radially outwardly thereof whereby the terminator ampacity may be significantly increased.

The term "pothead" has commonly been used in industry interchangeably with cable termination, terminator or terminal. In general, the term "pothead" is an abbreviation for "potential head" which defines a construction provided at the end of an insulated high voltage cable to bring about a desired potential gradient from the base conductor to the conductive sheath of the high voltage cable. The terminology presently employed in describing cable terminations, terminators or terminals is generally covered in a publication by the Institute of Electrical and Electronic Engineers (I.E.E.E.) identified as Std 48-1975 entitled "IEEE Standard Test Procedures and Requirements for High-Voltage Alternating-Current Cable Terminations", issued May 9, 1975.

In preparing the end of a high voltage cable for termination, the outer conductive sheath or shield layer is normally cut back a predetermined distance from the end of an insulation layer which, in turn, is cut back from the axial conductor so as to expose an end portion thereof. The shield layer is cut back sufficiently to provide adequate creepage distance between the live conductor and the grounded shield layer. It is known that if two electrically conducting bodies, such as an axial conductor and a coaxial conductive shield layer of a high voltage cable, are separated by a distance small in comparison with the surface dimensions of the conducting bodies, the electrical field in the region between the bodies is substantially uniform and perpendicular to the surfaces of the conducting bodies. The difficulty, however, comes at the boundaries of the conducting bodies or at the boundary of one of them if its area is much less extensive than the area of the other conductor, such as when the shield layer of a high voltage conductor cable is cut back from the axial conductor and a portion of the insulation layer.

Cutting back the shield and insulation layers creates an abrupt discontinuity in the electrical characteristics of the cable and materially increases the maximum voltage gradient (volts/mil) of the insulation in the area of the shield end. The increase in voltage gradient at the shield end changes the shape of the resulting electrical field so that the stress is no longer uniform and normal to the adjacent surfaces of the conducting bodies but produces a large component of stress along the surface of the insulation in a direction parallel to the conducting surfaces. Thus, the maximum voltage gradient is shifted from a radial stress, which diminishes outwardly from the conductor, to a longitudinal stress at the end of the cable shield layer. The nature of the cable insulation is such that it more readily withstands an electrical stress in the radial direction than along its longitudinal surface so that the risk of breakdown is substantially greater in the longitudinal direction.

It has been found that without means to distribute the electrical field along substantially the full length of a cable termination, the electrical stress will generally be concentrated in approximately 10% of the length of the termination adjacent the end of the shield layer. Attempts have been made to distribute the electrical field along the length of a cable termination to reduce the concentration of electrical stress at the end of the shield layer by enlarging the terminating diameter of the ground potential shield utilizing a construction commonly termed a stress relief cone. Terminations rated 230 kV and above generally incorporate both a stress relief cone and electrically connected condensers or capacitors which are placed in coaxial relation along the length of an exposed insulation layer and the underlying axial conductor. See, for example, U.S. Pat. Nos. 1,868,962, dated July 26, 1932 and 2,068,624, dated Jan. 19, 1937, as representative of early efforts to distribute electrical stress more uniformly over the length of a cable termination. A more recent design is disclosed in U.S. Pat. No. 3,758,699, dated Sept. 11, 1973, and assigned to the assignee of the present invention.

Another problem existing to some extent in prior art capacitance graded terminators but which is presently of increasing concern is heat transfer. The heat generated in power cables is primarily due to $I^2R$ losses which increase rapidly with current and also increase with temperature through higher conductor resistance. The problems created by heat generation are found in substantially all high voltage cable terminations but are greater in capacitance type terminations because the paper or other material employed as the dielectric in the capacitors acts as thermal insulation so that the heat created in the termination is constrained internally. As a result, the internally generated heat does not dissipate radially through the termination as rapidly as is the case with cable terminations employing merely a stress cone, such as disclosed in U.S. Pat. No. 3,796,821, dated Mar. 12, 1974, and assigned to the assignee of the present invention.

The aforementioned U.S. Pat. No. 3,758,699 discloses one technique for dissipating heat in capacitance graded high voltage cable terminations wherein an insulating liquid dielectric is circulated through the internal capacitor region of the cable termination to dynamically cool the cable termination without degradation of its dielectric characteristics. While this technique of dynamic cooling is effective in increasing the current carrying capacity of the associated high voltage cable, it requires the insulating liquid dielectric, typically a high dielectric strength oil, to be conducted from the high voltage end of the termination through a return insulator generally coextensive with the insulator section of the pothead termination. The cooling oil is then passed from the lower or grounded end of the return insulator to a heat exchanger from which a circulating pump forces the cooling oil through suitable filters to the entrance of the cable termination for return circulation therethrough. The need for the return insulator and associated heat exchanger and filter system adds to the cost of systems employing such dynamic cooling.

Another means for dynamically cooling an electric cable termination incorporating a hollow core conductor is disclosed in U.S. Pat. No. 3,716,652, dated Feb. 13, 1973, and assigned to the assignee of the present invention. In this patent, an insulating liquid dielectric is passed through a closed loop having flow passages within the high voltage cable, and a heat exchanger and pump disposed at the normally high voltage end of the pothead. Electrical energy for the electric drive motor is derived from the high voltage cable. While this system is also effective in increasing the current carrying capacity of the high voltage cable, the closed cooling loop and associated heat exchanger, circulating pump, current transformer and control module add to system costs.

One of the primary objects of the present invention is to provide a novel method and means for dissipating heat created internally of a capacitance graded high voltage cable termination without significant added cost.

A more particular object of the present invention is to provide a method and means for dissipating heat in a capacitance graded pothead termination for a high voltage power cable wherein a plurality of axially stacked capacitor elements are disposed coaxially along the length of a prepared end of the high voltage power cable, the method and means including the placement of thermally conductive discs between the stacked capacitor elements in a manner to provide decreased resistance to transfer of heat from inside the annular capacitor elements to the area externally thereof.

Still another object of the present invention is to provide a capacitance graded termination for a high voltage power cable wherein a plurality of spirally wound annular capacitor elements are disposed in axially stacked relation coaxially along the prepared terminal end of the high voltage conductor so that regions of substantially parallel equipotential planes are established between the stacked capacitor elements, and wherein thermally and electrically conductive annular discs are interposed between the stacked capacitor elements within said regions to effect radial dissipation of heat from internally of the capacitor elements, each annular heat transfer disc having a configuration so that it lies substantially parallel to the equipotential planes in the corresponding region and has its inner edge wholly within the region of parallel equipotential planes.

According to one feature of the present invention each heat transfer disc has a central circular opening therethrough the diameter of which is at least equal to and preferably slightly greater than the internal diameter of the adjacent stacked capacitor elements so that the conductive discs do not extend inwardly of the envelope of the inner surfaces of the capacitor elements.

A feature of one embodiment of the present invention lies in the provision of thermally and electrically conductive discs between stacked capacitor elements in a high voltage cable termination, each of the conductive discs having an outer circumferential lip adapted to engage a portion of the outer surface of an adjacent capacitor element to facilitate predetermined positioning of the discs relative to the capacitors during assembly of the pothead termination.

The various objects, features and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 2 is an enlarged fragmentary sectional view of a portion of the capacitor stack of FIG. 1 to better illustrate the heat transfer discs in accordance with the present invention;

FIG. 3 is a plan view of a heat transfer disc employed in the pothead termination of FIG. 1;

FIG. 4 is a transverse sectional view through the heat transfer disc of FIG. 3; and FIG. 5 is an enlarged fragmentary sectional view similar to FIG. 2 but illustrating alternative heat transfer discs in accordance with the present invention.

Figure 1:
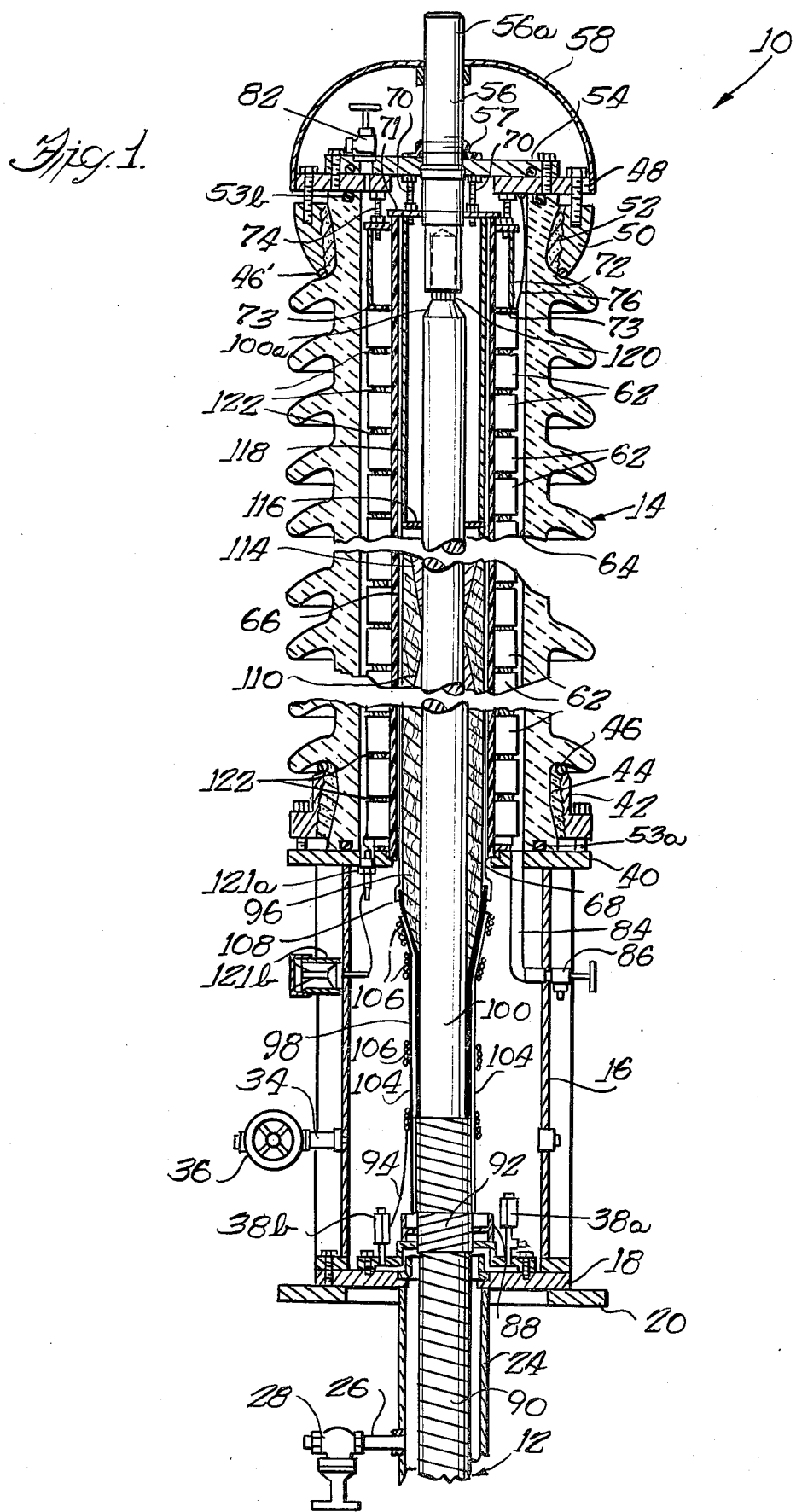
FIG. 1 is a foreshortened longitudinal sectional view of a capacitance graded high voltage cable termination incorporating the present invention.

In preparing a high voltage cable termination in accordance with one embodiment of the present invention, a high voltage cable having an axial conductor, an outer conductive shield and an intermediate insulation layer is prepared by stripping back portions of the outer shield layer and the insulation layer so as to expose predetermined lengths of the axial conductor and insulation layer to prepare the cable for termination. The prepared end of the cable is secured within an upstanding riser or manifold wherein the shield layer is conductively grounded.

The shield layer is terminated in a stress relief element and received internally within a capacitor stacking tube over which a plurality of annular capacitor elements are mounted in coaxial stacked relation so that a region of substantially parallel equipotential planes is established between each pair of stacked capacitors. An annular porcelain insulator is mounted over the capacitor stack to form the cable termination insulator section.

To effect the dissipation of heat created by the high voltage cable inwardly of the annular capacitors, a thermally and electrically conductive annular disc is positioned between each pair of stacked capacitor elements so that each conductive disc is located in the electrical stress field in such a manner that its presence will not radically change the shape of the equipotential surfaces. In the illustrated embodiment, each conductive disc lies substantially parallel to the equipotential planes comprising the corresponding region of parallel equipotential planes, and has its inner peripheral edge disposed wholly within the region of parallel equipotential planes. To this end, each conductive disc preferably has a circular central opening of a diameter at least equal to or slightly greater than the inner diameters of the adjacent annular capacitor elements.

In an alternative embodiment, each thermally and electrically conductive disc has an outer circumferential lip formed thereon adapted to fit against a portion of the outer peripheral surface of a juxtaposed capacitor element so as to facilitate assembly of a cable termination.

In the aforementioned U.S. Pat. No. 1,868,962 to Atkinson, a series of thin wide metal rings (identified at reference numeral 4) are provided to encircle a rigid insulating sleeve (7) and underlying insulation layer (2) on a high voltage conductor (1). A series of condensers are connected between the rings (4) in a manner to distribute electrical stress along the terminal end of the conductor and exposed insulation layer which would otherwise be concentrated at the cut-away end of the sheath. It is recognized in this Atkinson patent that if the rings (4) ended in sharp inner edges, the electrical strain acting radially between the inner edges of the rings and the coaxial conductor (1) would be concentrated at the inner edges of the rings and would result in ionization and breakdown in the form of a radial puncture of the condenser dielectric or in a longitudinal flashover. This concentration of electrical strain at the radial inner edges of the Atkinson rings (4) could reasonably be expected because the rings would deform the equipotential lines along the insulation layer and disturb the electrical field, causing regions of high electrical stress subject to electrical failure. To avoid this difficulty, Atkinson provides each ring (4) with a continuous extension or zone (44) at the radial inner edge of the ring so that the extension lies sleeve-like longitudinally on the insulating sleeve (7). Having so formed the inner edges of the rings (4) with sleeve-like extensions (44), Atkinson then recognized that the extensions (44) must be insulated one from another, and therefore recurved the extensions at their free edges in order to decrease the electrical field intensity at the free edges.

A somewhat similar technique for distributing the electrical stress in a high voltage termination is found in the aforementioned U.S. Pat. No. 2,068,624 to Atkinson which discloses a plurality of condensers (identified at reference numeral 5) disposed coaxially along the length of an insulation bushing (7) which is interposed between the conductive sheath (3) and the exposed conductor (1). The condensers (5) are electrically connected between successive pairs of zones (4) each of which defines an electrically conductive annular sleeve-like portion extended at one end in an outstanding flange (41). The zones (4) in their aggregate extent cover more than half of the surface of the insulation bushing (7).

As aforementioned, in accordance with the present invention, heat-dissipating annular discs are disposed between each pair of adjacent stacked capacitors so that the discs lie substantially parallel to the equipotential planes in the corresponding regions between the stacked capacitors with the inner peripheral edges of the discs lying wholly within the regions of parallel equipotential planes. As used herein, the term "equipotential planes" is meant to include both radial planes of equipotential established between annular capacitors having end surfaces lying in planes normal to the axes of the capacitors, and planes of equipotential which are not truly planar in the strict sense. For example, annular capacitors having frustoconical internal and external surfaces could be stacked in axially stacked relation and would define frustoconical shaped "planes" of equipotential between the stacked capacitors.

Because the annular heat-dissipating discs in accordance with the present invention lie in regions of substantially parallel equipotential planes, they may be made sufficiently thick that their cross-sectional area provides substantial area for conductive heat transfer therethrough. The annular discs are preferably made from copper to utilize its desirably high heat transfer coefficient, and have a thickness of at least about 20 mils to provide desired heat transfer cross-sectional area.

Referring now to the drawings, and in particular to FIG. 1, the present invention is illustrated, by way of example, in a high voltage cable termination, indicated generally at 10. The cable termination 10 is shown terminating an end of a high voltage cable 12, such as a cable capable of use in a 230 kV system and higher. Briefly, the termination 10, which may be termed a pothead termination, includes a porcelain insulator section 14 supported on a generally tubular entrance body section 16 having a base entrance plate 18 fixed in any suitable manner on a mounting plate 20. The mounting plate 20 may in turn be supported on a suitable framework (not shown) through support insulators so as to support the cable termination in upstanding relation.

In the illustrated embodiment, the cable termination 10 is adapted for use with an oil filled pipetype cable system under high pressure. The entrance body section 16 is also adapted to have an insulating liquid dielectric introduced therein by means of an entrance conduit 34 having a control valve 36 connected in line therewith. The insulating liquid dielectric is typically a high dielectric strength oil. Internal filter bypass units 38a and 38b are mounted within the entrance body section 16, as is known.

As best seen in FIG. 1, the porcelain insulator section 14, which may be 8 feet or longer in length, is mounted at its lower end on a mounting plate 40 which forms an upper end of the entrance body section 16. To this end, a bronze cementing flange 42 is attached to the porcelain insulator by a suitable cementing material 44 and is bolted to the mounting plate 40. An annular cushion gasket 46 is interposed between the upper end of the flange 42 and the insulator 14. An annular mounting plate 48 is mounted on the upper end of the porcelain insulator section 14 by bolting the mounting plate to an annular cementing flange 50 which is secured on the insulator by a suitable cementing material 52. An annular cushion gasket 46' is interposed between the flange 50 and insulator 14 in a similar manner to gasket 46. Annular sealing gaskets 53a and 53b are interposed between the insulator and the respective mounting plates 40 and 48. A stainless steel closure or cap plate 54 is mounted on the stainless steel mounting plate 58 and receives a connector 56 axially therethrough. A sealing cap 57 and associated O-ring seal are mounted on cap plate 54 about the connector 56. A corona shield 58 is mounted on the mounting flange 48 so as to cover the upper end of the termination and has a central aperture to receive the upper end of the connector 56 therethrough.

A plurality of annular capacitors 62 are supported on the mounting plate 40 internally of an axial bore 64 in the porcelain insulator 14. The capacitors 62 are of equal physical size and preferably comprise spirally wound layers of paper, such as electrical grade kraft paper, and aluminum strips which are wound in alternating layers and bound about their outer surfaces by a suitable tape binder. The capacitors 62 have outer diameters less than the inner diameter of the insulator bore 64 so as to define an annular passage therebetween permitting the introduction of an insulating liquid dielectric.

The capacitors 62 are assembled coaxially over a cylindrical barrier support tube 66 which is typically formed of epoxy or phenolic material and has an outer cylindrical surface sized to snugly engage the inner cylindrical surfaces of the capacitors 62. The lower end of the support tube 66 is received within a counterbore 68 in the mounting plate 40 and is retained therein by two or more adjustable screws 70 which act between the cap plate 54 and an annular clamping plate 71 engaging the upper end of support tube.

A capacitor stack blocking sleeve 72 is disposed about the upper end of the capacitor stack support tube 66 and is clamped between an annular disc 73 engaging the upper end of the capacitor stack and the mounting plate 48 through adjustment screws 74. A conductor lead 76 connects the capacitor stack to a suitable terminal on the mounting plate 48. As will become more apparent hereinbelow, the capacitors 62 establish regions of substantially parallel equipotential planes between adjacent pairs of the stacked capacitors, it being appreciated that in the illustrated embodiment the equipotential planes are substantially normal to the axis of the cable 12.

A suitable valve 82 is mounted on the cap plate 54 and communicates with the internal volume of the termination 10 and the cable 12. The valve 82 is adapted for connection to a vacuum source (not shown) and, after assembling the termination 10 onto the prepared cable 12, is opened to evacuate the termination prior to filling with an insulating oil dielectric in accordance with conventional techniques. A lower conduit 84 and control valve 86 are mounted on the mounting plate 40 to communicate with the internal volume of the termination and extend outwardly of the entrance body 16 to facilitate filling and draining of the termination.

The high voltage cable 12 is installed within the pothead termination in a more or less standard manner, the cable extending upwardly through the riser pipe or tube 24 and through a suitable oil semi-stop gland seal 88 which acts either directly on the outer cable shield layer 90 of the cable or on an auxiliary wrap layer 92. The shield layer 90 is conductively connected to ground in a conventional manner, such as through a conductor 94.

The cable 12 extends into the entrance body section 16 where the shield layer 90 is terminated in a stress relief cone element formed by conventional techniques from wrappings of a paper roll 96 tapered upwardly and outwardly from the insulation layer and covered with a semi-conducting material 98 which extends along a length of exposed insulation layer 100 to the cut-back terminal end of the cable shield layer 90. A plurality of flat wires or strips 104 of copper or other suitable conductive material extend longitudinally along the lower end of the shield layer 90 and the semi-conducting sleeve 98, the strips 104 being spaced circumferentially about the cable in a spaced apart arrangement and held together by wire servings 106. The upper end of the semi-conducting sleeve 98 is terminated at 108 with a shield band of copper and crepe paper tape.

The paper roll 96 is impregnated with the insulating liquid dielectric to form thin layers of high dielectric strength which extend upwardly along the cable insulation layer 100 a substantial distance, terminating at a tapered upper end 110 at approximately midlength of the termination. An auxiliary paper roll 114, also comprising thin layers of oil impregnated paper of high dielectric strength, exends upwardly along the insulation layer 100 from the paper roll 96 and terminates at a blocking disc 116 which abuts the lower end of a tubular blocking member 118 clamped between the disc 116 and the upper cap plate 54. The paper rolls 96 and 114 are spaced slightly from the inner surface of the capacitor stacking tube 66 to form a small oil gap therebetween. The blocking tube 118 is slotted (not shown) to permit the cavity defined therewithin to be filled with liquid dielectric as are all of the remaining zones within the interior space in the porcelain insulator 14.

The insulation layer 100 is tapered at its upper terminal end 100a and the bared axial conductor 120 is inserted and fixed within an axial bore in the connector 56. It will be understood that suitable seals are provided to prevent oil leakage about the connector 56 which terminates at its upper end in an aerial connector stub 56a. Power factor test bushings 121a and 121b of known design are mounted within the entrance body section 16 as shown in FIG. 1.

With the cable termination 10 thus far described, the insulating liquid dielectric which fills the paper insulation rolls 96 and 114 and the area internally of the stacked capacitors 62 remains generally static so that radial transfer of heat, produced by the $I^2R$ losses in the conductor, through this region of relatively poor thermal conductivity but high dielectric strength is relatively poor. As aforementioned, the problem of heat transfer in high voltage terminations, and particularly in capacitance graded high voltage terminations, is of particular concern because the paper employed as the dielectric in the capacitors acts as thermal insulation so that heat created by the $I^2R$ heat losses is constrained internally of the capacitors.

An important feature of the present invention lies in the provision of thermally and electrically conductive means between the stacked capacitors 62 for the purpose of dissipating heat radially from internally of the capacitors to the area externally thereof along the length of the cable termination. In the embodiment illustrated in FIGS. 1-4, the thermally and electrically conductive means comprise annular heat transfer discs 122 one of which is disposed between each pair of stacked capacitors 62 in coaxial relation therewith. The heat transfer discs, which may alternatively be termed heat dissipating rings, are mounted between the capacitors 62 so as to lie in the regions of parallel equipotential planes between the stacked capacitors, with the conductive discs being disposed substantially parallel to the equipotential planes in the regions between the capacitors so as not to change the initial shape of the equipotential surfaces.

The heat transfer discs 122 are made of a suitable thermal and electrically conductive material, such as copper, having a relatively high heat conductivity. The annular heat transfer discs are sized so that their inner peripheral edges 124, which define the central circular openings therein, lie wholly within the corresponding regions of parallel equipotential planes between successive capacitors. To this end, the inner circular edge surfaces 124 of the heat transfer discs preferably have diameters equal to or slightly greater than the inner diameters of the annular capacitors 62 such that, in assembled coaxial relation, the inner edges of the heat transfer discs do not extend radially inwardly within the cylindrical envelope defined by the inner surfaces of the capacitors. Preferably, the diameters of the inner circular openings 124 in the transfer discs 122 have diameters slightly greater than the diameters of the inner cylindrical surfaces of the capacitors 62 so that the inner edges of the heat transfer discs are spaced slightly radially outwardly from the cylindrical envelope of the inner surfaces of the capacitors.

By mounting the heat transfer discs 122 between the capacitors 62 so that the heat transfer discs lie within equipotential regions between the successive capacitors, the heat transfer discs may be made sufficiently thick that their cross-sectional area provides substantial area for conductive heat transfer therethrough. In accordance with a preferred embodiment of the invention, the heat transfer discs 122 are preferably made from copper and have a thickness of at least about 20 mils to provide the desired heat transfer cross-sectional area.

In the embodiment illustrated in FIGS. 1-4, the heat transfer discs 122 have outer diameters equal to or slightly less than the diameters of the outer cylindrical surfaces of the stacked capacitors 62, whereby the outer edges of the heat transfer discs do not extend radially outwardly from the outer surfaces of the stacked capacitors. It is believed that the region radially outwardly of the annular capacitors 62 is not as critical as the area or region inwardly of the capacitors so that the outer edges of the conductive discs 22 may extend outwardly of the capacitors a slight distance. Preferably, however, the conductive discs are sized so as not to extend radially outwardly of the outer envelope of the capacitors.

By providing heat transfer discs or rings 122 in accordance with the present invention, a significant increase in the rate of heat transfer or dissipation from internally of the stacked capacitors 62 to the area radially outwardly of the capacitors is effected. By increasing the rate of heat transfer radially through the capacitor stack, the cable in the termination will be able to carry a larger current in the cable conductor without an increase in the conductor temperature. The maximum permissible current in a cable system is directly proportional to the power transmission capacity of the system.

It is noted that the heat transfer discs 122 have been illustrated and described in conjunction with capacitors 62 of the spirally wound type. The heat transfer discs 122 may also be used to substantially improve radial heat dissipation in capacitance graded terminations of the type employing capacitors having their dielectric layers disposed in substantially parallel radial planes, sometimes termed "pancake" style capacitors. In "pancake" style capacitors the dielectric layers are generally flat as are the conductive layers interposed between the dielectric layers in parallel alternating relation therewith. Spiral wound capacitors are preferred because the capacitance values necessary to obtain sufficient grading of the electrical field along the cable in the termination when employing "pancake" style capacitors will require a large outer diameter of the "pancake" style construction with attendant problems of increased heat insulation caused by the large diameter of the capacitor construction. "Pancake" style capacitors are generally more costly than spiral wound capacitors of equal rating and also lead to increased costs for larger diameter components external to the capacitor stack.

FIG. 5 illustrates an alternative embodiment of thermally and electrically conductive means for use with the termination 10 in accordance with the present invention. The thermally and electrically conductive means of FIG. 5, comprises heat transfer discs 130, one of which is disposed between each pair of stacked capacitors 62 internally of a porcelain insulator 14. The heat transfer discs 130 are in substantially all respects similar to the aforedescribed heat transfer discs 122 except that each of the heat transfer discs 130 includes an outer circumferential lip 132 formed integral thereon. The circumferential lips 132 are substantially perpendicular to the planes of their associated planar disc portions, and each lip is adapted to engage the outer surface 62a of an adjacent capacitor 62. While the circumferential lips 132 on the conductive discs 130 illustrated in FIG. 5 are shown as extending downwardly to engage the outer surfaces of the underlying capacitors 62, the discs 130 may be positioned so that the lips 132 extend upwardly to engage the outer surfaces of the adjacent overlying capacitors. The circumferential lips 132 on the conductive discs 130 serve to facilitate assembly of the capacitor stack with the heat transfer discs interposed between successive capacitors by insuring predetermined positioning of the conductive discs relative to the adjacent capacitors. The heat transfer discs 130 are also preferably made of copper and have a thickness of approximately at least 20 mils or 0.020 inches, the thickness of the heat transfer discs being selected to be as thick as possible without unduly extending the height of the corresponding capacitor stack 62 and associated porcelain insulator 14.

It is possible to shape more complicated heat tranfer elements to fit and follow more complicated equipotential surfaces elsewhere in the cable termination than between the capacitors 62. However, the described annular heat transfer discs 122 and 130 are simple to fabricate and are very efficient in the transfer of heat from the interior of the cable termination. More complex shaped heat transfer elements located to fit and follow more complicated equipotential surfaces elsewhere in the cable termination would not only be substantially more expensive, but undoubtedly would also be less efficient in heat dissipation because they would not, in general, be located in regions with high thermal gradients along the equipotential surface.

Thus, in accordance with the present invention, the rate of radial heat dissipation from internally of a stack of annular capacitors to the area externally thereof in a capacitance graded high voltage cable termination is significantly improved through the provision of thermally and electrically conductive disc means disposed between the stacked capacitors to lie within regions of parallel equipotential planes and in parallel relation to the equipotential planes.

While preferred embodiments of the present invention have been illustrated and described, it will be understood that changes and modifications may be made therein without departing from the invention in its broader aspects.

Various features of the invention are defined in the following claims.

What is claimed is:

1. In a graded capacitor type high voltage cable termination which includes, in combination, the prepared end of a high voltage cable having an axial conductor, an outer annular insulator disposed coaxially over said prepared end of said cable and defining a space therebetween, and a plurality of annular capacitor elements disposed over said prepared end of said cable in stacked relation within said space so that regions of substantially parallel equipotential planes are established between said stacked capacitors; the improvement comprising thermally conductive means interposed between at least two adjacent ones of said stacked capacitors and having thermal communication with the area inwardly of said capacitors, said thermally conductive means being substantially parallel to said parallel equipotential planes and having an inner opening defined by an inner peripheral edge surface of said conductive means, said conductive means having a configuration such that said inner peripheral edge surface lies wholly within the region between said adjacent capacitors in which the equipotential planes are substantially parallel.

2. The combination as defined in claim 1 including thermally conductive means interposed between each pair of said stacked capacitors.

3. The combination as defined in claim 2 wherein said conductive means comprises thermally and electrically conductive disc means.

4. The combination as defined in claim 3 wherein each of said conductive disc means comprises a copper disc.

5. The combination as defined in claim 3 wherein said conductive disc means are generally planar.

6. The combination as defined in claim 1 wherein said conductive means comprises annular discs each of which has an outer diameter no greater than the diameter of an outer envelope of said annular capacitors.

7. The combination as defined in claim 1 wherein said inner opening in said conductive means is circular and has a diameter equal to or greater than the diameter of an envelope of the inner annular surfaces of said capacitors.

8. The combination as defined in claim 7 wherein said conductive means is made of copper.

9. The combination as defined in claim 3 wherein said disc means are at least about 0.020 inch thick.

10. The combination as defined in claim 1 wherein said conductive means comprises an annular thermally conductive disc having an outer circumferential lip adapted to engage the outer peripheral surface of an adjacent capacitor.

11. In a graded capacitor type high voltage cable termination which includes, in combination, the prepared end of a high voltage cable having an axial conductor, an outer annular insulator disposed over said prepared end of said cable and defining an annular space therebetween, and a plurality of substantially identical annular capacitor elements disposed coaxially over said prepared end of said cable in stacked relation within said space so that regions of substantially parallel radial equipotential planes are established between said stacked capacitors; the improvement comprising a thermally and electrically conductive annular disc interposed between each pair of said stacked capacitors and having thermal communication with the area inwardly of said capacitors, said conductive discs each having an inner circular opening therethrough facilitating assembly of said discs coaxially over said cable, each of said circular openings being defined by an inner peripheral edge surface of the corresponding disc and having a diameter at least as large as the diameter of the inner annular surfaces of said capacitors, said conductive discs each being disposed wholly within a corresponding region of substantially parallel equipotential planes in substantially parallel relation thereto.

12. A method of dissipating heat from an electrical high-voltage cable termination which includes, in combination, a prepared end of a high voltage electric cable having an axial conductor, an insulation layer immediately overlying said cable in coaxial relation thereon, and an outer conductive sheath layer coaxial along said insulation layer; said sheath and insulation layers being stripped back so as to expose predetermined lengths of said axial conductor and said insulation layer, a stack of annular capacitors disposed coaxially along said cable juxtaposed to said exposed axial conductor and said insulation layer so as to distribute electric stress along the length of said insulation layer and establish regions of substantially parallel equipotential planes between said stacked capacitors, and an annular insulator disposed coaxially over said stack of capacitors, said method comprising inserting an annular thermally conductive disc between each pair of said stacked capacitors within the region of substantially parallel equipotential planes between each pair of said stacked capacitors so that each of said discs has thermal communication with the area inwardly of said annular capacitors and is adapted to transfer heat generated by said axial conductor internally of said stacked capacitors to the area outwardly of said capacitors, said conductive discs being positioned to lie wholly within said regions of substantially parallel equipotential planes.

13. The method as defined in claim 12 wherein said heat transfer discs are made of an electrically and thermally conductive material.

* * * * *